United States Patent [19]
Rufo, Sr. et al.

[11] Patent Number: 5,096,064
[45] Date of Patent: Mar. 17, 1992

[54] ENCLOSURE FOR INFORMATION STORAGE DISKS WITH A TEMPORARILY INCREASING WIDTH

[75] Inventors: George F. Rufo, Sr.; George F. Rufo, Jr., both of Pittsfield, Mass.

[73] Assignee: Lakewood Industries, Inc., Pittsfield, Mass.

[21] Appl. No.: 532,810

[22] Filed: Jun. 4, 1990

[51] Int. Cl.$^5$ ............................................ B65D 85/30
[52] U.S. Cl. .................................... 206/444; 206/309; 206/311; 312/10; 369/291
[58] Field of Search ........ 206/444, 307, 309, 310-313, 206/453, 456; 369/291; 312/8-10

[56] References Cited

U.S. PATENT DOCUMENTS

| | | | |
|---|---|---|---|
| 3,860,248 | 1/1975 | Hunt et al. | 274/1 R |
| 3,942,639 | 3/1976 | Cournoyer et al. | 206/444 |
| 4,463,849 | 8/1984 | Prusak et al. | 206/307 |
| 4,617,655 | 10/1986 | Aldenhoven | 369/291 |
| 4,863,031 | 9/1989 | Tanaka et al. | 206/444 |
| 4,905,217 | 2/1990 | King et al. | 369/291 |

FOREIGN PATENT DOCUMENTS 63-29392  2/1988  Japan ................ 206/444

*Primary Examiner*—Paul T. Sewell
*Assistant Examiner*—Thomas P. Hilliard
*Attorney, Agent, or Firm*—Sixbey, Friedman, Leedom & Ferguson

[57] ABSTRACT

An enclosure for optical disks comprising: a rectangular top portion comprising a top wall, a pair of opposite depending side walls and a depending end wall; a rectangular bottom portion, including a bottom wall, sized to align with the bottom edges of the depending side walls and end wall of the top portion; welds securing the top and bottom portions at spaced apart locations along their periphery with the top and bottom walls in generally parallel, spaced relation for forming a box-like structure defining a cavity therewithin, the box-like structure having an access opening along its end opposite the end wall for permitting the insertion and removal therethrough of optical disks into and from the cavity; rigid projections projecting into the cavity from opposite side walls for reducing the side-to-side dimension of the cavity to less than the diamerter of the disk at a location along the side walls, the location positioned between the access opening and the point along each side wall corresponding to the diameter of the disk when fully received within the cavity, whereby the spaced apart welds allow the side-to-side dimension of the cavity to temporarily enlarge under the influence of the force exerted by the disk on the rigid projections, the side-to-side dimension of the cavity returning to its original interior dimension after the width of the disk becomes less than the originial diameter at the location. In a preferred embodiment the top and bottom portions are identical.

23 Claims, 10 Drawing Sheets

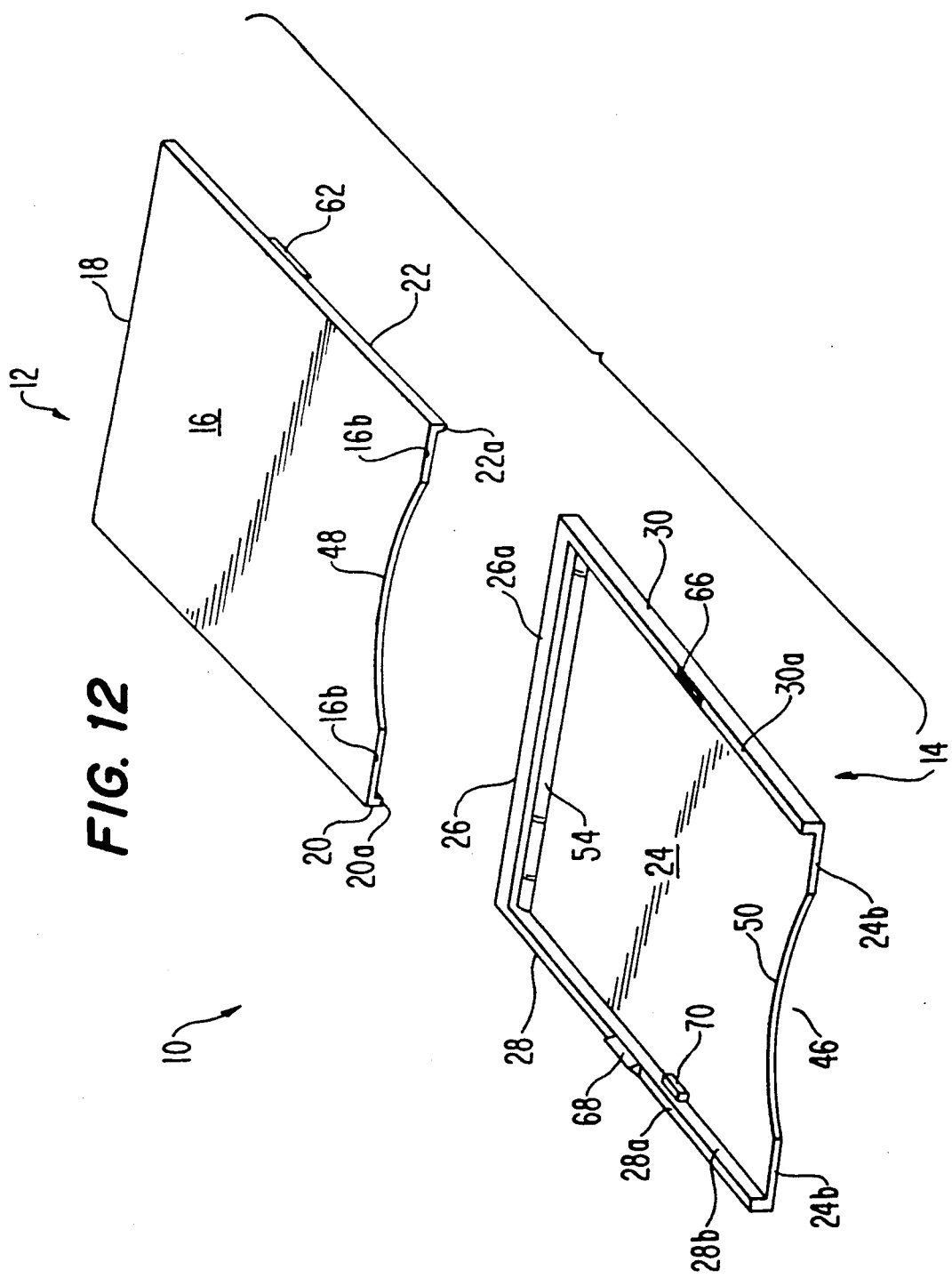

ENCLOSURE FOR INFORMATION STORAGE DISKS WITH A TEMPORARILY INCREASING WIDTH

BACKGROUND OF THE INVENTION

1. Field of the Invention

The present invention relates to an enclosure for receiving and storing digitally coded disks and, more particularly, to an enclosure which is configured to facilitate insertion and removal and to provide secure storage of a disk in a manner which safeguards the disk's information bearing surface against blemishes and scratches which may pierce its protective layer.

2. Description of the Prior Art

In recent years disk-form recording and storage media for audio, video and digital signals have become increasingly available. Particularly popular are compact disks known as CDs, in which audio or video information is digitally recorded by use of a laser beam and then read optically by a laser beam. Typically, information is placed on only one surface of the disk in digital form as a track of microscopic pits in a thin, reflective metallic layer. Similar disks, known as CD-ROMs, are employed to store digital information for use as read only and other memories in computer and other applications.

Typically, compact optical disks comprise one or more coating layers deposited upon an aluminum platter. Optical recording techniques deposit digital information on the disk and within the coatings in any one of a number of well known ways. A protective plastic coating on the surface of a CD or CD-ROM protects the information on the disk from environmental damage, such as from dust, debris, heat, fingerprints, and the like. Only significant scratches and blemishes which pierce the protective layer can interfere with the laser light beam which "reads" the information on the disk. One common cause of such damaging scratches and blemishes is the molded plastic storage enclosures or boxes of the types presently used to store such disks. These boxes contain many sharp plastic edges, particularly at the access opening to the box cavity where the arcuate, finger-grip cut-out portions formed in the box side walls can ride across and scratch or gouge the protective layer on the disk during disk insertion or removal and, thereby, damage the information-bearing surface of the disk. Another common cause of disk surface damage are the gripping tabs present within the cavities of some boxes and which are intended to grip the upper and lower surfaces of the disk near its peripheral edge to securely retain the disk within the cavities. The constant insertion of the disk into and removal of the disk from the gripping tabs abrades the protective layer and damages the information bearing surface of the disk. This is particularly troublesome when it is appreciated that compact disks are not made to particularly close tolerances and that there is significant disk thickness variation from the nominal 1.2 mm thickness of such disks. Disks which are thicker than nominal take a particularly severe beating upon insertion into and removal from such gripping tabs.

Probably the most widely used packaging and storage enclosure for compact disks comprises a three piece assembly consisting of a base, an insert or tray on which the disk is supported, e.g., by a center projection which engages the periphery of the aperture in the center of the disk, and which is positioned within the enclosure base, and a cover which may be hinged to the base and serves to enclose the disk-bearing tray within the cavity defined between the base and the cover. Enclosures of this type, although the current standard in the industry, are relatively expensive to manufacture, bulky and inconvenient to use.

Other types of enclosures for optical disks are also well known. For example, the enclosure disclosed in U.S. Pat. No. 4,905,217-King et al. comprises a one-piece structure providing a box-like enclosure open at one end wall for insertion and removal of a disk therethrough into the box cavity and includes a pair of gripping tabs at the opposite end wall within the cavity. The enclosure disclosed in U.S. Pat. No. 4,627,531-Clemens comprises generally rectangular top and bottom portions interconnected about their periphery by side portions for forming a box-like enclosure defining a cavity for receiving a disk therein and which is open at one end, the open end being covered by a closure strip which is movable along a guide path between enclosure open and closed positions. Still another disk enclosure, shown in U.S. Pat. No. 4,687,101-Barker et al., comprises a housing having spaced top and bottom wall surfaces, opposed side walls and an end wall forming a three-sided enclosure open at the opposite end for inserting and removing a disk therethrough into and from the enclosure, the end wall being formed with a V-shaped notch which opens into the housing for securely retaining the disk within the housing during transportation or handling.

Each of these enclosures suffers from one or more shortcomings which make it either unsatisfactory or not particularly desirable for use as an optical disk enclosure. Either the enclosure is undesirable because it is bulky, expensive to manufacture and inconvenient to use or it is unsatisfactory because it is not particularly safe for insertion, removal and storage of an optical disk therewithin without substantial risk of damaging the information bearing surface of the disk. Accordingly, there remains a need for a simple, inexpensive and easy to use optical disk enclosure which is configured to facilitate safe insertion and removal of the disk therein and therefrom, which securely and safely stores the disk therewithin and which safeguards the disk's information bearing surface against blemishes and scratches which may pierce its protective layer.

SUMMARY OF THE INVENTION

The present invention provides an improved enclosure for optical disks, such as CDs and CD-ROMs, which overcomes the disadvantages and deficiencies of prior optical disk enclosures and which facilitates the safe insertion, removal and storage of optical disks therewithin. In addition, the enclosure of the present invention is simple, inexpensive to manufacture, compact and easy to use.

In one aspect of the present invention there is provided an enclosure for optical disks which comprises: a generally rectangular top portion comprising a top wall, a pair of opposite depending side walls and a depending end wall; a generally rectangular bottom portion, including a bottom wall, sized to align with the bottom edges of the depending side walls and end wall of said top portion; means securing said top and bottom portions with said top and bottom walls in generally parallel, spaced relation for forming a generally rectangular box-like structure defining a cavity therewithin of a size sufficient to receive and store an optical disk, said box-like structure having an access opening along the end thereof opposite said end wall for permitting the insertion and removal therethrough of optical disks into and from said cavity; means associated with said opposite side walls for reducing the interior side wall-to-side wall dimension (hereinafter "side-to-side dimension") of said cavity to less than the diameter of said disk at at least one location along said side walls, whereby said disk peripheral edge contacts and exerts a force on said diameter side-to-side dimension reducing means as said disk is inserted into said cavity, said at least one location positioned between the access opening and the point along each side wall corresponding to the diameter of the disk when fully received within the cavity; said securing means comprising means securing said top and bottom portions to each other at a plurality of spaced apart locations along their periphery for allowing the interior side-to-side dimension of said cavity at said location to temporarily enlarge under the influence of the force exerted by the disk on said dimension reducing means, whereby said disk is able to slide into said cavity, the interior side-to-side dimension of said cavity at said location returning to its original interior dimension after the width of the disk at said location becomes less than the original side-to-side dimension at said location. In a preferred embodiment the dimension reducing means comprise rigid means projecting from each of the opposite side walls into the cavity for reducing the side-to-side dimension of the cavity at the projecting means. Most desirably, the projecting means is positioned very closely adjacent the location corresponding to the diameter of the disk when fully received within the cavity.

In another and preferred aspect of the invention the bottom portion comprises a pair of opposite upstanding side walls and an upstanding end wall and said top and bottom portions are secured to each other, with said top and bottom walls in spaced relation, the bottom surfaces of said side walls and end wall of said top portion abutting the top surfaces of said side walls and end wall of said bottom portion.

In still another aspect of the invention the dimension reducing projecting means is unitary, elongate in the direction of the side wall from which it projects and comprises a central portion having a predetermined projection dimension, a first end portion on said access opening end of said central portion tapering in projection dimension from said side wall to said predetermined thickness dimension for providing gradual sliding contact between the peripheral edge of the disk and said projecting means and a second end portion on said end wall end of said central portion tapering in projection dimension from said predetermined thickness dimension to said side wall for providing a gradual termination of sliding contact between said disk peripheral edge and said projecting means.

In yet another aspect of the present invention the securing means secures said top and bottom portions to each other at spaced apart locations along the side walls with the portion of said side walls adjacent said elongate projecting means being free of securing means. Most preferably the securing means secures said top and bottom portions to each other over elongated portions of each side wall forwardly and rearwardly of said projecting means.

In still another aspect of the present invention the side walls include disk peripheral edge guiding portions inclined at an obtuse angle with the respective top and bottom walls for defining between the abutting side walls on each side of said box-like enclosure a disk peripheral edge guide slot in which the disk peripheral edge is slidable for facilitating the insertion and removal of disks into and from said cavity. The guide slot extends rearwardly from the front access opening and, in a preferred aspect, the obtuse angle increases from a relatively low value at the access opening of the box-like enclosure to a higher value at said projecting means.

In accordance with another aspect of the invention the cavity-facing side-to-side extending corners defined between the top wall and the depending end wall of the top portion and the bottom wall and the upstanding end wall of the bottom portion includes an integrally molded rib extending between opposite side walls and upwardly or downwardly along each end wall for at least a portion of the wall length. Preferably, the rib extends a sufficient length along each end wall that, when the respective end walls are abutted to form said box-like enclosure, the top and bottom ribs define a converging notch in which the peripheral edge of the disk can be supported with insufficient separation between the ribs to permit the peripheral edge of a fully inserted disk to contact said end walls.

In yet another aspect of the invention the corresponding side and end walls of the top and bottom portions may be provided with alignment means such as tabs, bosses, grooves, notches, or other conventional means to facilitate positioning the top and bottom portions in abutting contact prior to securing these portions to one another, e.g., by ultrasonic welding. In one preferred form of the invention one side wall of the top portion includes an elongate alignment boss depending from the bottom surface thereof while the bottom surface of the other side wall includes a downwardly opening elongate groove formed in the bottom surface thereof. The side walls of the bottom portion include an upwardly opening elongate groove in the top surface of one of the side walls for receiving the elongated alignment boss and an elongated alignment boss upstanding from the top surface of the other side wall for insertion into the downwardly facing elongate groove.

In still another aspect of the invention the top and bottom walls of the box-like enclosure include aligned arcuate cut-outs adjacent the front access opening defining a finger opening for facilitating the grasping of a disk when removing it from the cavity. The arcuate cut-outs extend at least 50%, preferably about 75%, of the distance between said opposite side walls along each of the top and bottom walls for providing gradual and smooth curved surfaces at the access opening of the box-like enclosure in order to assure the absence of sharp edges or corners which could scratch, blemish or gouge the protective layer overlying the information-bearing surface of the disk.

The invention will be better understood by reference to the following description and appended claims taken in conjunction with the accompanying drawings.

BRIEF DESCRIPTION OF THE DRAWINGS

FIG. 12 is an exploded perspective view of the box-like enclosure of the present invention.

DETAILED DESCRIPTION OF THE PREFERRED EMBODIMENTS

Figure 13:
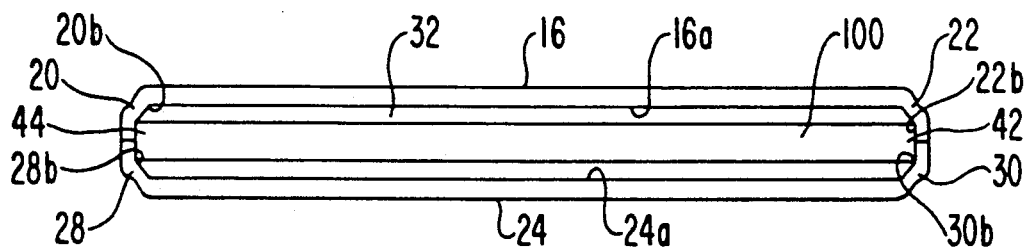
FIG. 13 is a front view of the disk enclosure of the present invention with top and bottom portions secured.

Referring to the drawings and particularly to FIGS. 12 and 13 there is shown a preferred embodiment of the optical disk enclosure 10 of the present invention. Enclosure 10 is adapted to safely receive and securely store a CD, CD-ROM or other optical disk in a manner which safeguards the disk's information bearing surface against blemishes, scratches or gouges which may pierce its protective layer.

Enclosure 10 is a box-like enclosure formed by securing top portion 12 to bottom portion 14, preferably by solvent welding or ultrasonic welding in the manner hereinafter described, although it will be appreciated that other well known securing methods may be employed insofar as they are consistent with the functioning of the enclosure, as will be more fully described hereinafter. The top and bottom portions 12, 14 of enclosure 10 are preferably formed by injection molding using a transparent thermoplastic composition which permits the ultimate user of the enclosure to visually observe the disk or any graphics which may be stored within cavity 32. In the preferred embodiment described herein, top and bottom portions 12, 14 are identical for ease of manufacture in order that only a single molding tool need be designed and built and only a single part produced thereby which may function as either the top or bottom portion of the enclosure. However, it will be appreciated that the top and bottom portions need not be identical and may be different from each other in many respects. For example, the wall heights need not be the same on the respective portions or one portion may include the top wall as well as the entire peripheral wall of the enclosure while the other portion may comprise only the bottom wall. There are many other respects that the top and bottom portions may differ, several of which will become apparent from the following description.

Figure 1:
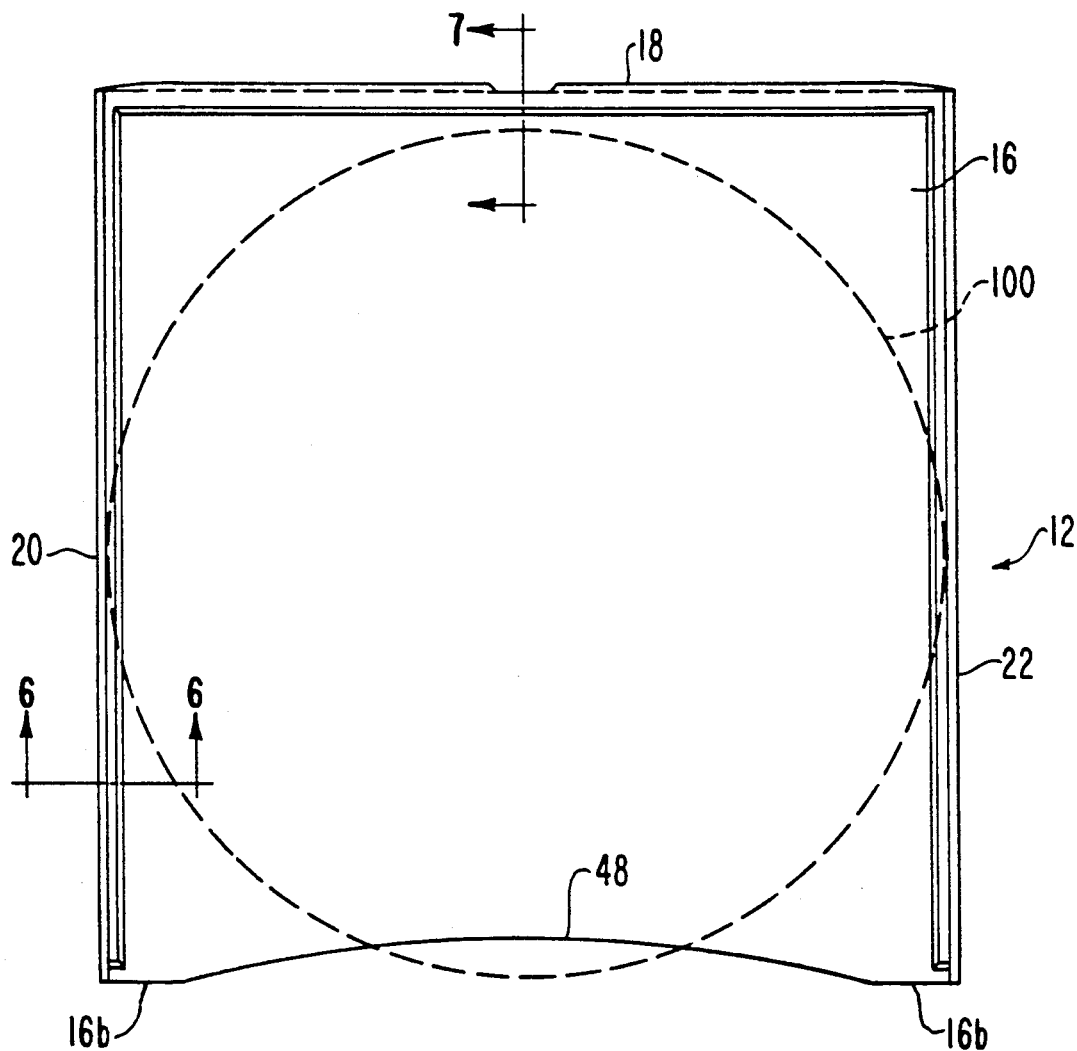
FIG. 1 is a top plan view of a top portion of the disk enclosure of the present invention.
Figure 2:
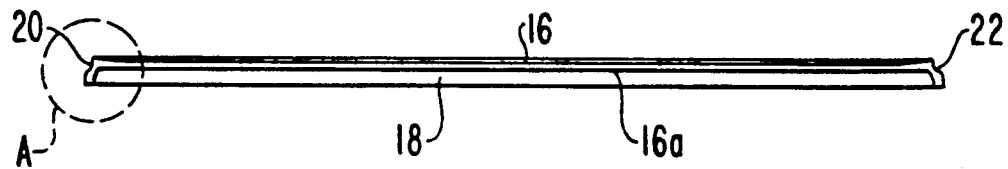
FIG. 2 is a front view of the top portion of the disk enclosure of FIG. 1.
Figure 3:
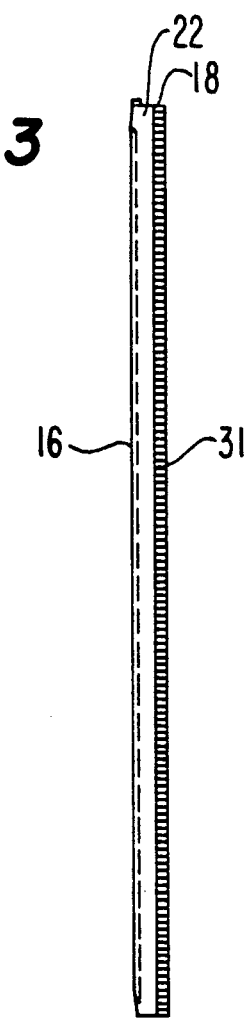
FIG. 3 is a side view of the top portion of the disk enclosure of FIG. 1.

In the embodiment shown, wherein the top and bottom portions are identical, it can be seen from FIGS. 12, 13, 14 and 1-4 (which illustrate a portion oriented as a top portion) that top portion 12 comprises a generally rectangular top wall 16, a depending rear wall 18 and a pair of depending opposite side walls 20, 22 which extend rearwardly from the front of top portion 12, the side, end and top walls all being cojoined for defining a three sided, tray-like structure. In similar fashion, bottom portion 14 comprises generally rectangular bottom wall 24, an upstanding rear wall 26 and a pair of upstanding side walls 28, 30 which extend rearwardly from the front of bottom portion 14, the side, end and top walls all being cojoined for defining a three sided, tray-like structure identical to the structure of top portion 12. Top and bottom portions 12, 14 are assembled to each other with top wall 16 spaced from bottom wall 24 by the combined height of the side and end walls of each portion. Specifically, the bottom surfaces 18a, 20a, 22a of top portion walls 18, 20, 22 are positioned in abutting relationship with the top surfaces 26a, 28a, 30a of bottom portion walls 26, 28, 30 to form a generally rectangular box-like enclosure, open at front end 46, which defines a disk-receiving cavity 32 in the enclosed space between the top and bottom walls 16, 24 and cojoined peripheral walls 18, 20, 22 and 26, 28, 30. The side walls 20, 22 and 28, 30 of each of the top and bottom portions 12, 14 include a roughened or textured area 31 on their outer surfaces, as shown in FIG. 3 with respect to side wall 22, which may be formed by serrating, ribbing, knurling or other well known method, to facilitate grasping and using box-like enclosure 10.

Figure 14:
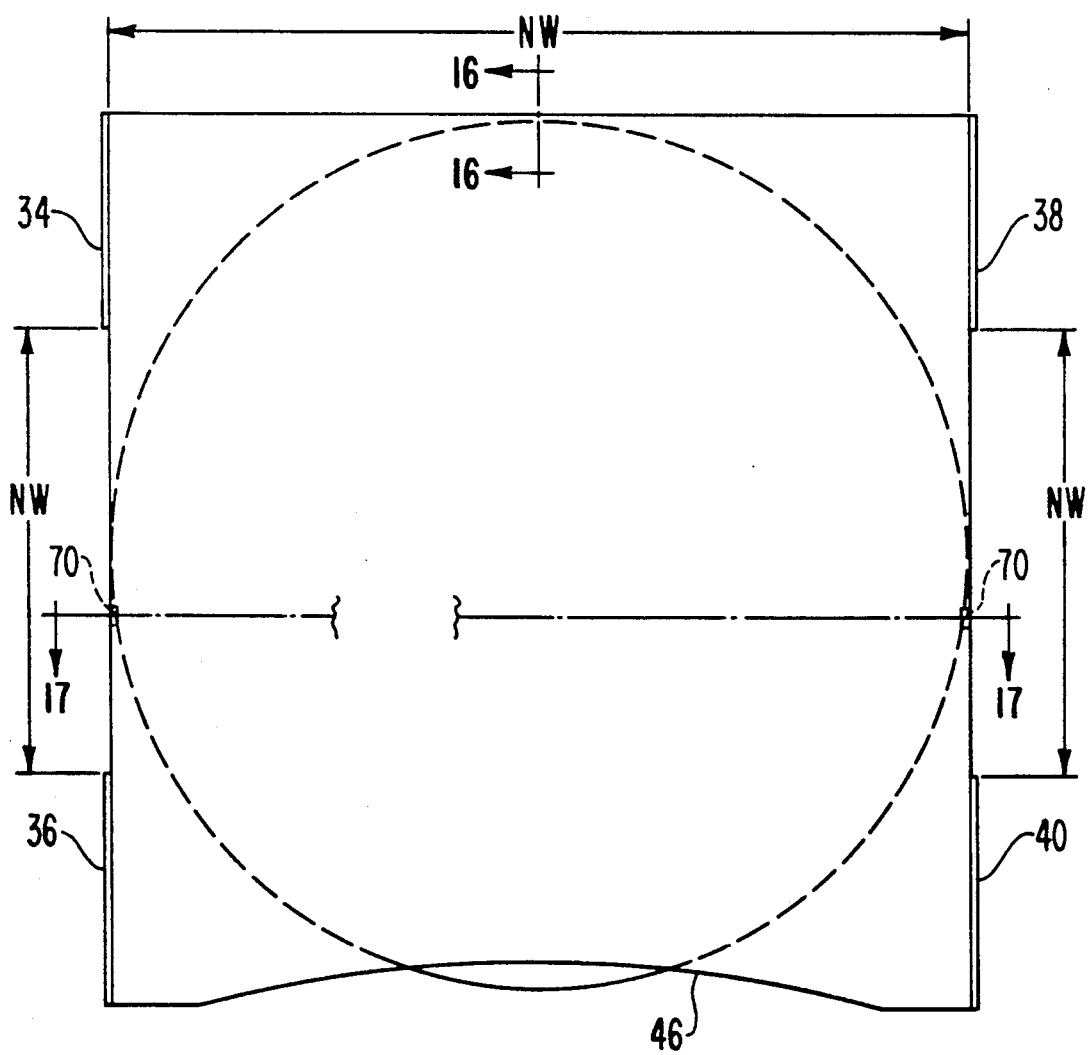
FIG. 14 is a top plan view of the disk enclosure of the present invention schematically illustrating preferred weld locations.

As will be described more fully hereinafter, the walls are secured, as by welding, to each other at a plurality of spaced apart locations 34, 36, 38, 40 around the periphery of enclosure 10 (see FIG. 14). It will be appreciated that securing the top and bottom portions in this manner leaves a plurality of non-welded areas, e.g., areas designated as "NW" in FIG. 14 comprising a plurality of spaced apart slits around the periphery of enclosure 10. This, as will become apparent from the description which follows, allows top and bottom portions 12, 14 to bow or move outwardly away from each other and/or from a disk within cavity 32 to allow insertion and removal of the disk past cavity side-to-side dimension narrowing means associated with the side walls.

Referring to FIG. 13 it can be seen that top wall 16 and bottom wall 24 are spaced apart a distance which is greater than the thickness of disk 100 so that when disk 100 is stored within cavity 32 the flat surfaces thereof are spaced from the inner surfaces 16a, 24a of top and bottom walls 16, 24. This is facilitated by forming the side walls 20, 22, 28, 30 with disk peripheral edge contacting portions 20b, 22b, 28b, 30b which form an obtuse angle with the respective top and bottom walls 16, 24. When the top and bottom portions 12, 14 are abutted and secured, the abutting side wall disk peripheral edge contacting portions on each side of the enclosure, 20b and 28b on one side and 22b and 30b on the opposite side. define disk peripheral edge guide slots 42, 44 which extend rearwardly from front access opening 46 of the enclosure. These slots 42, 44 receive the disk peripheral edge when the disk is in the cavity and slidably guide the insertion and removal of the disk therefrom. As will be seen, in a particularly preferred embodiment of the invention, the obtuse angle increases from a relatively low value at the front access-opening 46 of box-like enclosure 10 to higher values at locations along the side walls which are rearward of the access opening 46.

It can be seen that the configuration of box-like enclosure 10 is so arranged that no matter how disk 100 is inserted into cavity 32 through open access opening 46 only the peripheral edges of the optical disk ever touch the surfaces of enclosure 10. Access opening 46 and slots 42, 44 are configured to align the optical disk 100 parallel to and spaced from the inner surfaces 16a, 24a of top and bottom walls 16, 24. To assure the safety of disks inserted or removed from cavity 32 through access opening 46, the typical, narrow finger opening formed in the top and bottom walls of conventional optical disk enclosures, which facilitates the grasping of a disk when removing it from the enclosure cavity, has been eliminated to obviate the damage it frequently causes to information bearing surfaces of disks as a result of the sharp or rough plastic edge of the relatively narrow finger opening cut-outs riding across a disk surface and scratching or gouging it. In accordance with the present invention, as can be seen most clearly in FIGS. 12, 14, 1 and 4, the top and bottom walls 16, 24, at the front edges 16b, 24b thereof, have formed therein aligned arcuate cut-outs 48, 50 which define a finger opening which allows easy grasping of a disk in cavity 32 while assuring the absence of sharp edges or corners which could scratch or gouge the disk. Arcuate cut-outs 48, 50 extend at least 50%, preferably about 75%, of the distance along front edges 16b, 24b between opposite side walls. Forming the cut-outs over a major portion of the length of the front edges 16b, 24b provides gradual and smooth curved surfaces at the front access opening 46 of the box-like enclosure 10.

Figure 7:
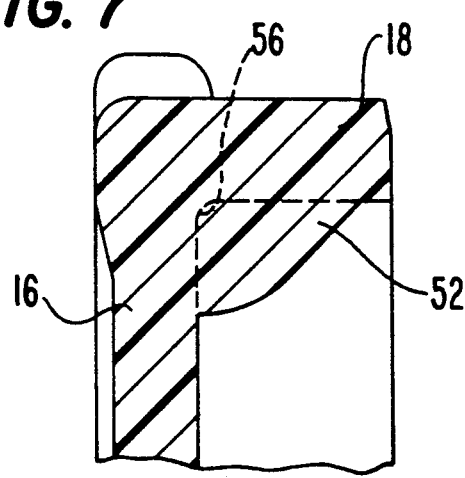
FIG. 7 is an enlarged sectional view taken along line 7—7 in FIG. 1.
Figure 4:
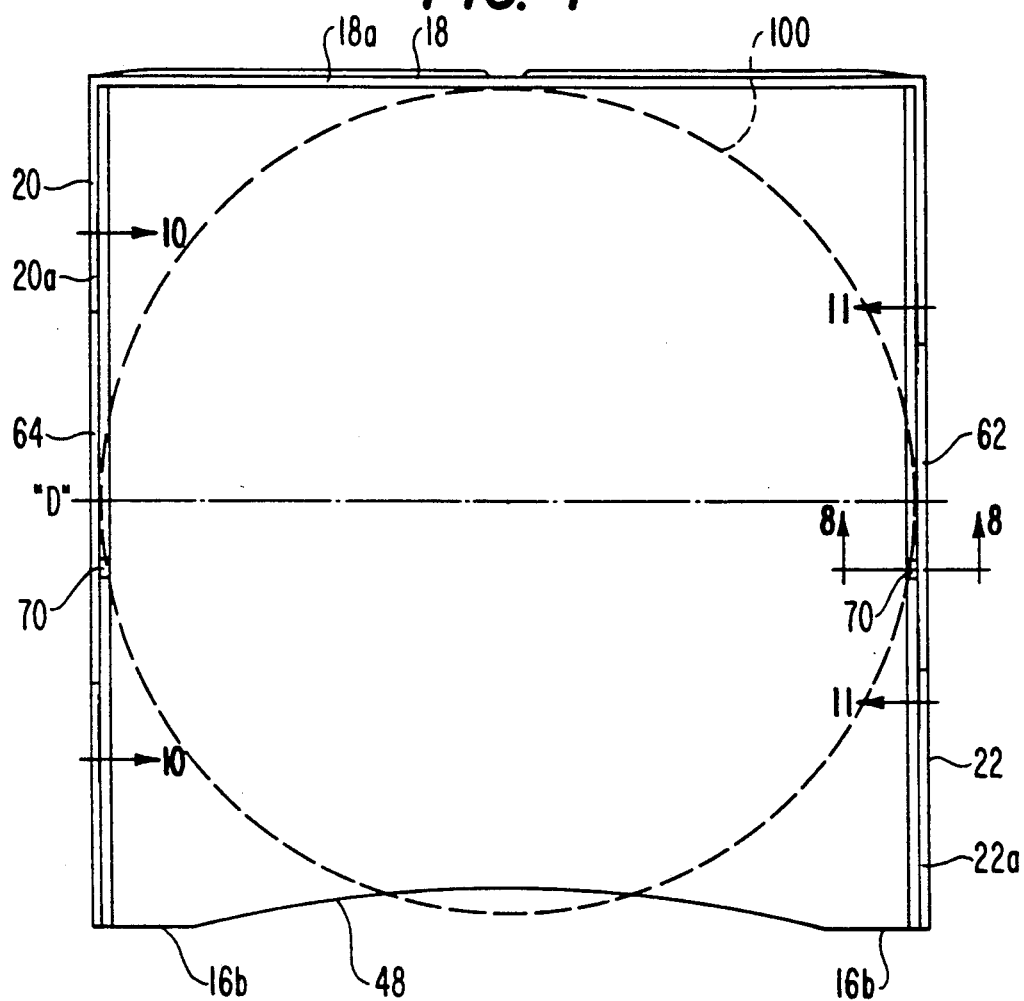
FIG. 4 is a bottom view of the top portion of the disk enclosure of FIG. 1.
Figure 16:
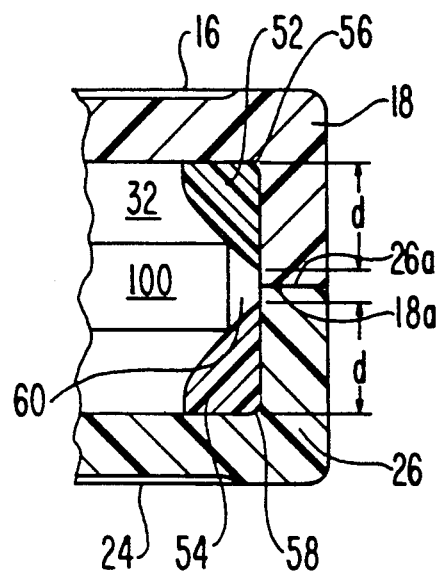
FIG. 16 is a sectional view taken along line 16—16 in FIG. 14 and rotated 90°.

Referring to FIGS. 7, 12 and 16, rear walls 18 and 26 include side wall-to-side wall extending integrally molded ribs 52, 54 positioned at the cavity-facing corner 56, 58 defined, respectively, between top wall 16 and depending rear wall 18 and between bottom wall 24 and upstanding rear wall 26. Rib 52 extends along a portion "d" of the length of rear wall 18 and rib 54, likewise, extends along a portion "d" of the length of rear wall 26. When top and bottom portions 12, 14 are secured together with respective rear wall surfaces 18a and 26a in abutting, relation, ribs 52, 54 define therebetween a rearwardly tapering notch 60 in which the peripheral edge of the disk can be supported when it is stored within cavity 32. In a preferred form of the invention, ribs 52, 54 extend sufficiently along the length of respective rear walls 18 and 26, i.e., "d" is sufficiently large, that there is insufficient separation between the ribs to permit the peripheral edge of a fully inserted disk to actually contact end walls 18, 26. In this manner, notch 60 supports and cushions the disk against vibration and impact while it is stored within enclosure 10.

To simplify the assembly of the top and bottom portions 12, 14 to each other, to assure proper alignment of the abutting surfaces and to facilitate securing of the portions by welding, the peripheral abutting walls of the top and bottom portions may be provided with alignment means such as tabs, bosses, grooves, notches, or other conventional alignment means. Referring in particular to FIGS. 10, 10a, 11, 11a and 12 there is shown one preferred form of alignment means for use in connection with the present invention. An elongate, desirably chisel-shaped in cross-section, alignment boss 62 depends from the bottom surface 22a of top portion side wall 22. A correspondingly dimensioned and cross-sectioned elongate groove 64 is formed in bottom surface 20a of top portion side wall 20. Both boss 62 and groove 64 are positioned at corresponding locations intermediate the ends of and along surfaces 22a and 20a so that they will align in vertical registry with corresponding grooves and bosses on identical molded structures serving as bottom portions. Thus, top surface 30a of bottom portion side wall 30 includes an elongate groove 66, identical to groove 64, formed therein for receiving chisel-shaped, elongate alignment boss 62 therein. Likewise, top surface 28a of bottom portion side wall 28 has upstanding therefrom an elongate alignment boss 68, identical to boss 62, which is adapted to be inserted into elongate groove 64. With boss 62 received within groove 66 and boss 68 received within groove 64, the abutting surfaces of top and bottom portions 12, 14 are in proper alignment and the resulting box-like enclosure is ready to be welded, as described hereinbefore, to secure the top and bottom portions to one another.

Figure 15:
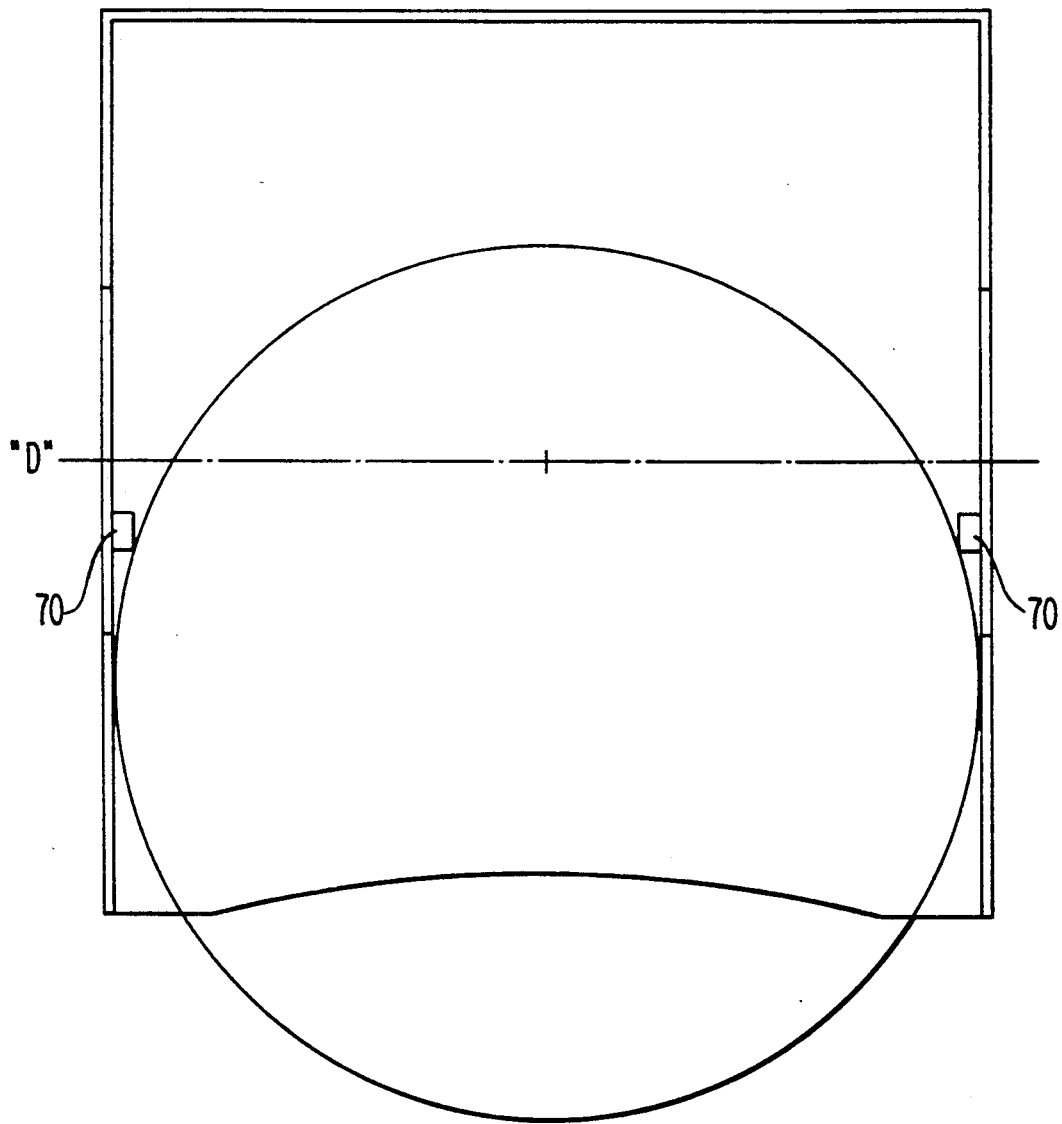
FIG. 15 is a top plan view of the disk enclosure of the present invention showing, in schematic fashion, the relationship between a partially inserted disk and the cavity diameter reducing means.
Figure 17:
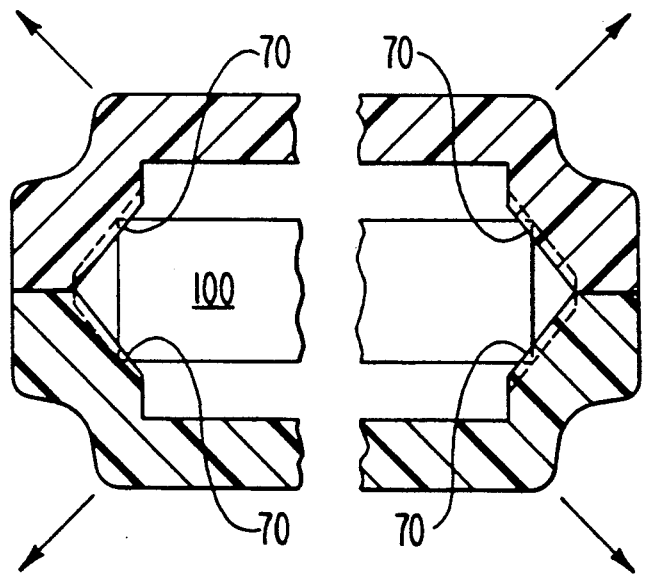
FIG. 17 is a sectional view taken along line 17—17 in FIG. 14.

FIGS. 4, 5, 6, 8, 9 and 12 illustrate cavity side-to-side dimension reducing means in the form of ridges 70 projecting from each of side walls 20, 22, 28, 30 and, specifically, from the disk edge contacting portions 20b, 22b, 28b, 30b thereof into cavity 32. Ridges 70 are rigid projections which are, preferably, integrally molded with the side walls and which function to reduce the side-to-side dimension of cavity 32 to less than the diameter of the optical disk for which enclosure 10 is intended. Each of the ridges 70 on each of the side walls of the top and bottom portions 12, 14 is positioned along its respective side wall at the same location relative to the front access opening 46 and the rear walls 18, 26. Thus, ridges 70 on each portion are in side-to-side registry and, when top and bottom portions are assembled into box-like enclosure 10, the ridges on the top portion side walls are in vertical registry with the ridges on the bottom portion side walls. As a result, as a disk is inserted through access opening 46 into cavity 32 the disk slides smoothly with its peripheral edges in guide slots 42, 44 until the width of the disk passing between aligned dimension-narrowing ridges 70 becomes greater than the reduced side-to-side dimension of the cavity 32 between ridges 70. At this point, as can be seen in FIGS. 15 and 17, ridges 70 interfere with the continued unobstructed insertion of the disk into the cavity. As the peripheral edges of the disk contact and engage ridges 70 under a continuing disk insertion force, the disk peripheral edges exert an outwardly directed force on the cavity-facing ridge surface of each ridge, as shown by the arrows in FIG. 17, which force tends to cause the top and bottom portions 12, 14 to bow or move outwardly away from each other and away from the disk. This movement of the top and bottom portions is accommodated, in accordance with the present invention, by the spaced apart weld portions 34, 36, 38, 40 along the abutting periphery of the enclosure 10 which provides spaced apart non-welded portions or openings in the abutting periphery as well. Thus, the top and bottom portions can effectively bow or move apart along the non-welded portion of the abutting periphery, which has the effect of temporarily increasing the side-to-side dimension of the cavity 32 at the ridges 70. As the disk continues to be inserted, up until the width of the disk positioned between ridges 70 becomes equal to the diameter of the disk, the top and bottom portions continue to bow or move outwardly and the side-to-side dimension of the cavity 32 at ridges 70 continues to increase to accommodate the increased diameter of the disk between the ridges. After the disk diameter passes between the ridges, and the width of disk therebetween begins to decrease, the top and bottom portions move inwardly toward their normal position, causing the side-to-side dimension of the cavity at the ridges 70 to decrease as the width of disk between the ridges permits. As this occurs, ridges 70 exert an inwardly directed force on the disk which assists the insertion process. This continues until the width of the disk between the ridges becomes less than the original cavity side-to-side dimension at the ridges at which point there is no longer any engagement between the disk peripheral edge and ridges 70. The smooth unobstructed insertion of the disk can continue until the disk is fully received within cavity 32 with the disk peripheral edge snugly received within notch 60 adjacent rear walls 18, 26. At this point the side peripheral edges of the disk are supported in guide slots 42, 44, the leading peripheral edge of the disk is supported within notch 60 and, in accordance with a preferred form of the invention, ridges 70 exert a retaining force on the disk which urges it snugly into notch 60 and prevents it from inadvertently slipping or falling out of cavity 32, regardless of the orientation of enclosure 10. This is accomplished by positioning ridges 70 along each side wall at a location between front access opening 46 and the point, designated "D" in FIG. 4, along each side wall corresponding to the diameter of the disk when fully received within the cavity. In a particularly preferred embodiment, ridges 70 are positioned very closely adjacent point "D" in order that ridges 70 continue to act on the peripheral edges of the disk, effectively holding the disk within notch 60 and preventing its movement within cavity 32. Preferably, ridges 70 extend into cavity 32 over a relatively small portion of the side wall length, i.e., less than one half the side wall length and, most desirably, from 1-10% of the side wall length.

The provision of both welded and non-welded portions along the abutting periphery of the top and bottom portions has been found to be particularly effective to permit the temporary increase in cavity side-to-side dimension at the ridges where the top and bottom portions are secured to each other at spaced apart locations along the side walls. In particular, it is desirable, as shown in FIG. 14, to secure the top and bottom portions to each other over elongated portions 34 of each side wall forward and rearward of ridges 70 and to provide a non-welded portion of the periphery immediately adjacent ridges 70.

Figure 9:
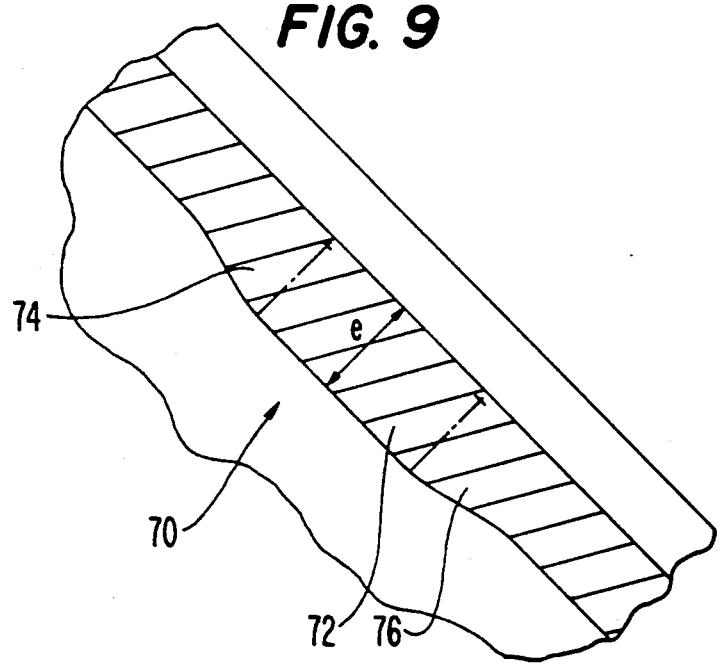
FIG. 9 is an enlarged sectional view taken along line 9—9 in FIG. 8.
Figure 5:
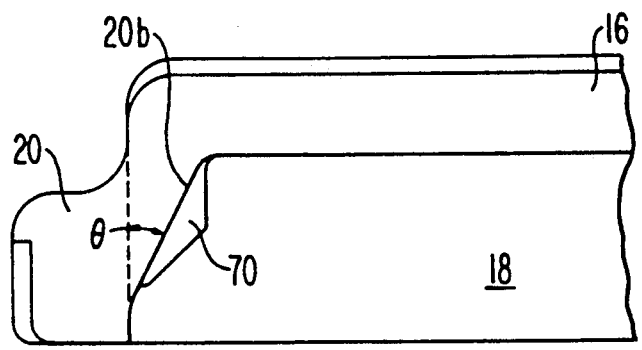
FIG. 5 is an enlarged front view of the region A of the top portion of the disk enclosure of FIG. 2.
Figure 6:
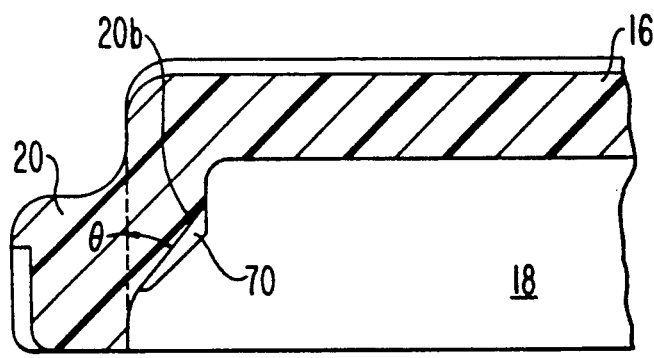
FIG. 6 is an enlarged sectional view taken along line 6—6 in FIG. 1.
Figure 8:
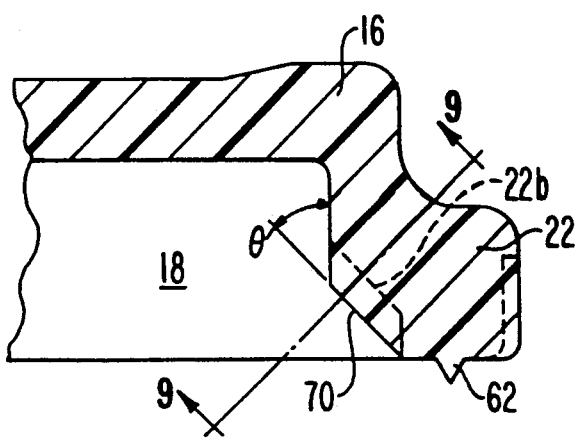
FIG. 8 is an enlarged sectional view taken along line 8—8 in FIG. 4.
Figure 10:
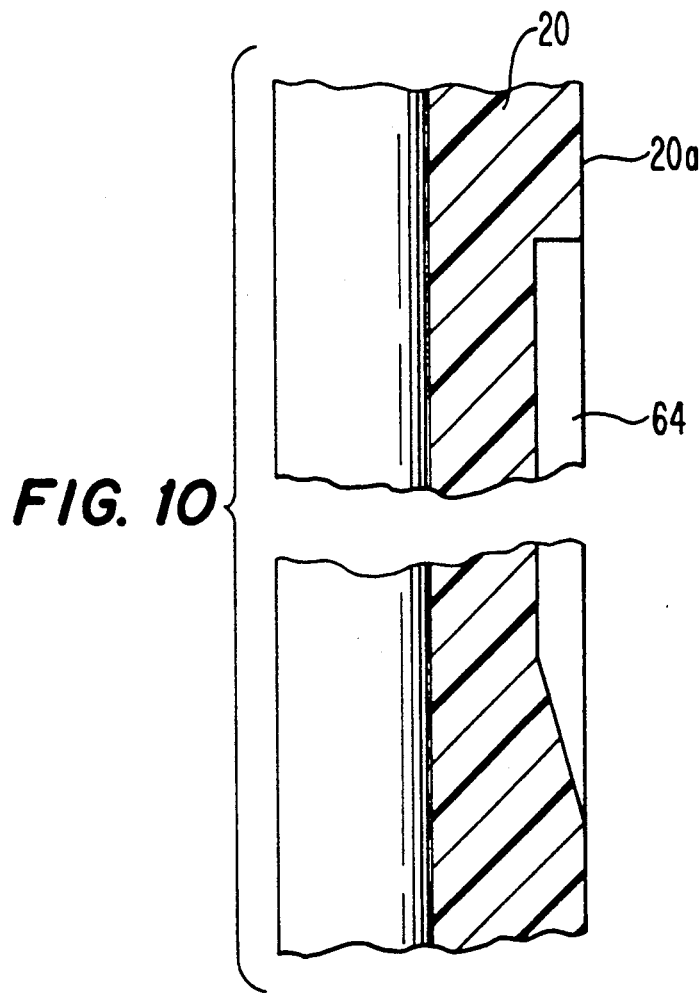
FIGS. 10 and 10a are enlarged sectional views taken along line 10—10 in FIG. 4.
Figure 10A:
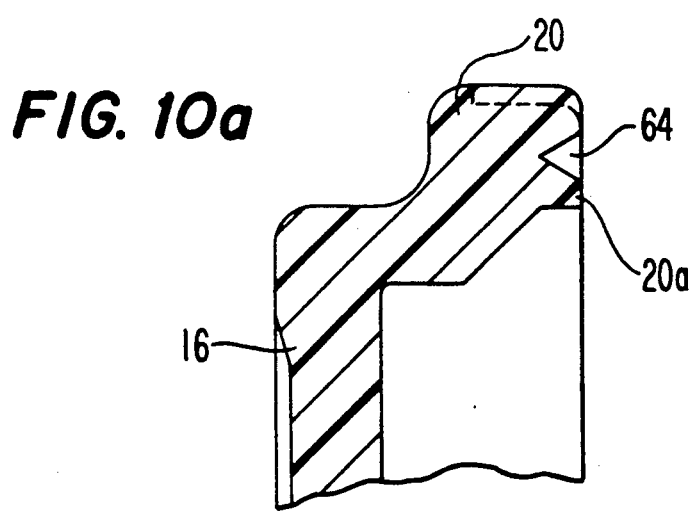
Figure 11:
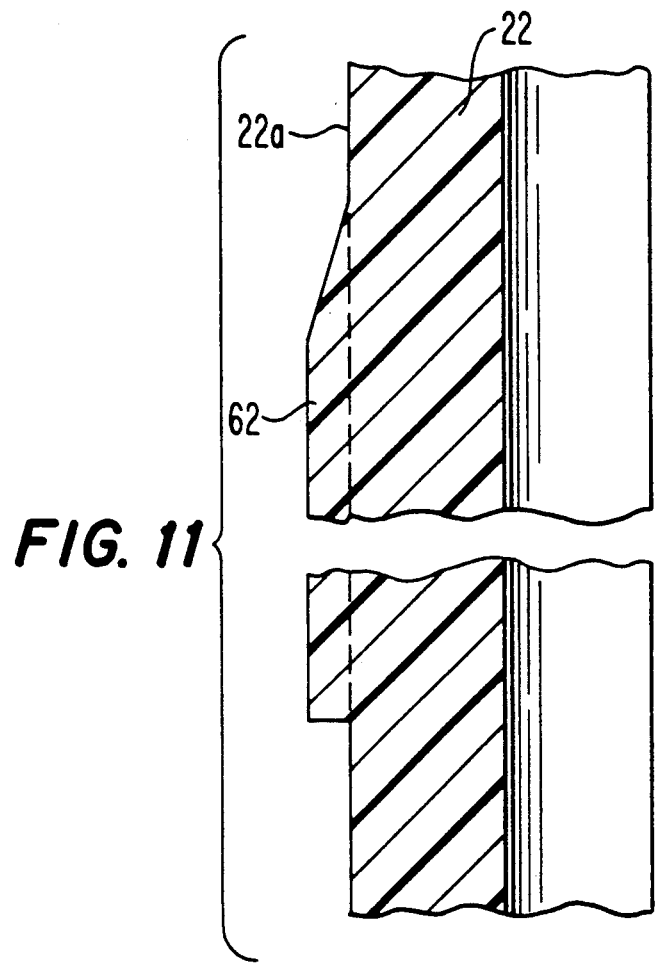
FIGS. 11 and 11a are enlarged sectional views taken along line 11—11 in FIG. 4.
Figure 11A:
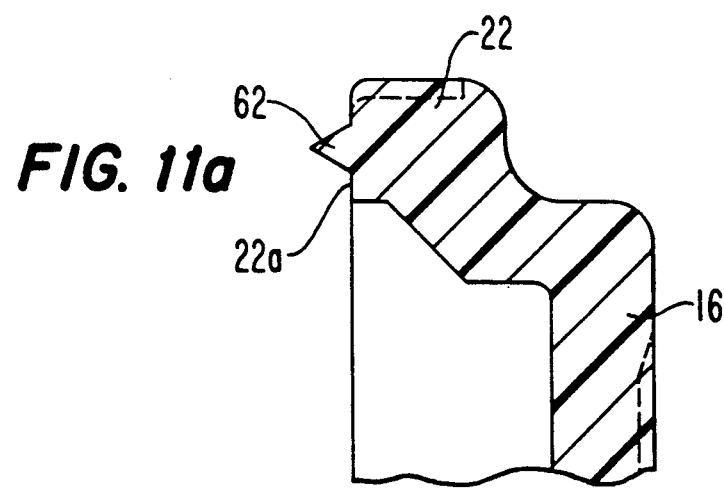

Ridges 70 desirably project into cavity 32 from the disk peripheral edge contacting portions 20b, 22b, 28b, 30b of side walls 20, 22, 28, 30. These portions, as previously discussed, are inclined relative to top and bottom walls 16, 24 to form an obtuse angle therewith which increases as portions 20b, 22b, 28b, 30b extend deeper into cavity 32. See, for example, FIGS. 5 and 6. Likewise, the acute angle formed between the side wall portions 20b, 22b, 28b, 30b and a plane passed perpendicular to the top and bottom walls 16, 24 and parallel to the side walls also increases as portions 20b, 22b, 28b, 30b extend deeper into cavity 32. This acute angle $\theta$ as shown in FIG. 5 may usefully be as low as 20°-30° to effectively widen the front access opening 46 to facilitate the insertion and removal of disks therethrough. As the side wall portions extend toward rear walls 18, 26, the acute angle $\theta$ gradually increases, as can be seen in FIG. 6, until, at ridges 70, it desirably reaches a maximum value which, in the preferred embodiment hereof, is about 45° (see FIG. 8). This gradual increase in acute angle $\theta$ effectively increases the inclination of the side wall portions 20b, 22b, 28b, 30b and tends to funnel the peripheral edges of the disk toward ridges 70. As can be seen in FIGS. 8 and 9, ridges 70 project into cavity 32 from an approximately 45° inclined side wall portion in order to most effectively direct the force applied to ridges 70 by the inserted disk in a direction which tends to increase the interior diameter of cavity 32 at ridges 70. Ridges 70 are desirably elongate and include a central portion 72 having a fixed projection "e" into cavity 32, a lead-in, inclined ramp portion 74 on the front end of central portion 72 for providing gradual sliding contact and engagement between the peripheral edge of the disk and the full projection "e" of ridges 70, and a corresponding lead-off, inclined ramp portion 76 on the rear end of central portion 72 for providing a gradual termination of sliding contact and engagement between the peripheral edge of the disk and the full projection "e" of ridges 70.

It will be appreciated that the box-like enclosure of the present invention in uniquely adapted for the safe insertion, removal and storage of optical disks therewithin. It may most simply be manufactured as a single piece, two of which may serve as top and bottom portions of the enclosure. At the same time it is relatively simple to injection mold, easy to assemble and convenient to use. Most importantly, it securely and safely retains the disk within the cavity during handling, transportation and storage and is configured to safeguard the disk's information bearing surface against scratches, blemishes or gouges which can pierce its protective layer. Accordingly, it will be appreciated that while the invention has been described with reference to particular embodiments thereof, numerous modifications may be made by those skilled in the art without departing from the true scope of the present invention or the scope of the appended claims.

We claim:
1. An enclosure for optical disks comprising:
  (a) a generally rectangular top wall, a generally rectangular bottom wall, opposite side walls and an end wall, said side and end walls joining said top and bottom walls in spaced, generally parallel, relationship for forming a three-sided box-like enclosure comprising said side and end walls as peripheral walls and defining a cavity therewithin of a size sufficient for receiving and storing an optical disk, said enclosure having an access opening along the end thereof opposite said end wall for permitting the insertion and removal therethrough of optical disks into and from said cavity;
  (b) means associated with said opposite side walls for reducing the side-to-side dimension of said cavity to less than the diameter of said disk at at least one location along said side walls, said at least one location positioned between said access opening and the point along each side wall which corresponds to the diameter of said disk when said disk is fully received within said cavity, whereby said disk peripheral edge contacts and exerts a force on said dimension reducing means as said disk is inserted into said cavity, said dimension reducing means comprising means sufficiently rigid to transfer the force exerted by said disk peripheral edge thereon into movement of said peripheral walls for causing the side-to-side dimension of said cavity to temporarily increase;

(c) a plurality of elongate spaced apart slits formed in said peripheral walls extending generally parallel to said top and bottom walls for allowing the side-to-side dimension of said cavity to temporarily increase at said at least one location to at least the diameter of said disk as said disk is inserted into said cavity, whereby the temporary increase in side-to-side dimension allows the diameter of said disk to pass said dimension reducing means and to slide into said cavity, the side-to-side dimension of said cavity at said at least one location returning to its original dimension after the width of said disk at said at least one location becomes less than the original cavity side-to-side dimension at said at least one location.

2. An enclosure, as claimed in claim 1, where said slits are formed in each of said side walls.

3. An enclosure, as claimed in claim 1, wherein said dimension reducing means comprise means projecting from said side walls into said cavity for reducing the side-to-side dimension of said cavity at said projecting means.

4. An enclosure, as claimed in claim 3, wherein said projecting means are elongate and project into said cavity from said side walls over a minor portion of the length thereof.

5. An enclosure, as claimed in claim 4, wherein said slits are formed in each said side wall between said projecting means and said access opening and said projecting means and said end wall.

6. An enclosure for optical disks comprising:

(a) a generally rectangular top portion comprising a top wall, a pair of opposite depending side walls and a depending end wall;

(b) a generally rectangular bottom portion, including a bottom wall, sized to align with the bottom edges of said depending side walls and end wall of said top portion;

(c) means securing said top and bottom portions with said top and bottom walls in generally parallel, spaced relation for forming a generally rectangular box-like structure comprising said side and end walls as peripheral walls and defining a cavity therewithin of a size sufficient to receive and store an optical disk, said box-like structure having an access opening along the end thereof opposite said end wall for permitting the insertion and removal therethrough of optical disks into and from said cavity;

(d) means associated with said opposite side walls for reducing the side-to-side dimension of said cavity to less than the diameter of said disk at at least one location along said side walls, said at least one location positioned between said access opening and the point along each side wall corresponding to the diameter of said disk when said disk is fully received within said cavity, whereby said disk peripheral edge contacts and exerts a force on said dimension reducing means as said disk is inserted into said cavity, said dimension reducing means comprising means sufficiently rigid to transfer the force exerted by said disk peripheral edge thereon into movement of said peripheral walls for causing the side-to-side dimension of said cavity to temporarily increase;

(e) said securing means comprising means securing said top and bottom portions to each other at a plurality of spaced apart locations along their periphery for allowing the side-to-side dimension of said cavity to temporarily increase at said at least one location to at least the diameter of the disk as said disk is inserted into said cavity, whereby the temporary increase in side-to-side dimension allows the diameter of said disk to pass said dimension reducing means and to slide into said cavity, the side-to-side dimension of said cavity at said at least one location returning to its original dimension after the width of said disk at said at least one location becomes less than the original cavity side-to-side dimension at said at least one location.

7. An enclosure, as claimed in claim 6, wherein said securing means comprises means securing said top and bottom portions to each other at spaced apart locations along each of said side walls.

8. An enclosure, as claimed in claim 6, wherein said dimension reducing means comprise means projecting from said side walls into said cavity for reducing the side-to-side dimension of said cavity at said projecting means.

9. An enclosure, as claimed in claim 8, wherein said projecting means are elongate and project into said cavity from said side walls over a minor portion of the length thereof.

10. An enclosure, as claimed in claim 9, wherein said securing means comprises means securing said top and bottom portions to each other over an elongate portion of the length of each side wall between said projecting means and said access opening and said projecting means and said end wall.

11. An enclosure, as claimed in claims 6, 7, 8, 9 or 10, wherein said means securing said top and bottom portions comprise weld means.

12. An enclosure, as claimed in claims 6, 7, 8, 9 or 10, wherein said bottom portion comprises a pair of opposite upstanding side walls and an upstanding end wall and said top and bottom portions are secured to each with said top and bottom walls in spaced relation, the bottom surfaces of said side walls and end wall of said top portion abutting the top surfaces of said side walls and end wall of said bottom portion.

13. An enclosure, as claimed in claim 12, wherein said top and bottom portions are identical.

14. An enclosure, as claimed in claim 12, wherein said at least one location is positioned closely adjacent the point along each side wall corresponding to the diameter of said disk when said disk is fully received within said cavity for effectively maintaining said disk and preventing its movement within said cavity.

15. An enclosure, as claimed in claims 6, 7, 8, 9 or 10, further including side-to-side extending rib means adjacent said end walls of said top and bottom portions for defining between said ribs in said cavity a side-to-side extending notch for receiving a peripheral edge of said disk when said disk is fully received within said cavity.

16. An enclosure, as claimed in claim 15, wherein said rib means is positioned within the angle defined between said end wall and said top and bottom wall, respectively, of said top and bottom portions.

17. An enclosure, as claimed in claim 16, wherein said notch tapers from its front toward said end walls and is sufficiently narrow at a point rearward of its front to prevent the peripheral edge of said disk from contacting said end walls.

18. An enclosure, as claimed in claims 6, 7, 8, 9 or 10, wherein said side walls include disk peripheral edge guiding portions facing into said cavity, said guiding portions being inclined at an obtuse angle with the respective top and bottom walls for defining, between the abutting side walls on opposite side of said box-like enclosure, disk peripheral edge guide slots which extend rearwardly from said access opening, a peripheral edge of said disk being slidable in each of said opposite slots for facilitating the insertion and removal of disks into and from said cavity.

19. An enclosure, as claimed in claim 18, wherein said obtuse angle increases from a relatively low value at the access opening of said box-like enclosure to a higher value at said projecting means for funneling said disk toward said projecting means.

20. An enclosure, as claimed in claim 18, wherein said means securing said top and bottom portions comprise weld means, said at least one location is positioned closely adjacent the point along each side wall corresponding to the diameter of said disk when said disk is fully received within said cavity and said enclosure further includes side-to-side extending rib means adjacent said end walls of said top and bottom portions for defining between said ribs in said cavity a side-to-side extending notch for receiving a peripheral edge of said disk when said disk is fully received within said cavity, whereby a disk inserted into said cavity is supported along opposite side peripheral edges by said guide slots during insertion and by said guide slots and said notch when fully received within said cavity.

21. An enclosure, as claimed in claims 9 or 10, wherein each said projecting means is elongate in the direction of said side wall and comprises a central portion having a predetermined projection dimension, a first end portion on said access opening end of said central portion tapering in projection dimension from said side wall to said predetermined thickness dimension for providing gradual sliding contact between the peripheral edge of the disk and said projecting means and a second end portion on said end wall end of said central portion tapering in projection dimension from said predetermined thickness dimension to said side wall for providing a gradual termination of sliding contact between said disk peripheral edge and said projecting means.

22. An enclosure, as claimed in claim 12, wherein the abutting bottom and top surfaces, respectively, of said top and bottom portion side and end walls include alignment means for facilitating positioning of said top and bottom portions in abutting contact prior to securing said portions to one another.

23. An enclosure, as claimed in claim 6, wherein said top and bottom walls of said box-like enclosure include aligned arcuate cut-outs adjacent said access opening for defining a finger opening which facilitates the grasping of a disk when removing it from said cavity, said arcuate cut-outs extending at least 50% of the distance between said opposite side walls along each of said top and bottom walls for providing gradual and smooth curved surfaces at the access opening of said box-like enclosure.

* * * * *